US008927457B2

(12) United States Patent
Von Blucher et al.

(10) Patent No.: US 8,927,457 B2
(45) Date of Patent: *Jan. 6, 2015

(54) PROCESS FOR PRODUCING SPHERICAL ACTIVATED CARBON

(75) Inventors: Hasso Von Blucher, Erkrath (DE); Ernest De Ruiter, Leverkusen (DE)

(73) Assignee: BLÜCHER GmbH, Erkrath (DE)

( * ) Notice: Subject to any disclaimer, the term of this patent is extended or adjusted under 35 U.S.C. 154(b) by 1909 days.

This patent is subject to a terminal disclaimer.

(21) Appl. No.: 11/890,356

(22) Filed: Aug. 6, 2007

(65) Prior Publication Data

US 2008/0171648 A1 Jul. 17, 2008

Related U.S. Application Data

(63) Continuation of application No. 10/240,340, filed as application No. PCT/EP01/04615 on Apr. 24, 2001, now Pat. No. 7,288,504.

(30) Foreign Application Priority Data

| Apr. 28, 2000 | (DE) | 100 20 921 |
| Aug. 18, 2000 | (DE) | 100 40 485 |
| Dec. 22, 2000 | (DE) | 100 65 936 |
| Feb. 24, 2001 | (DE) | 101 09 158 |

(51) Int. Cl.
| *C01B 31/08* | (2006.01) |
| *C01B 31/10* | (2006.01) |
| *A62D 9/00* | (2006.01) |
| *B01J 20/20* | (2006.01) |
| *B01J 20/28* | (2006.01) |
| *A62D 101/02* | (2007.01) |

(52) U.S. Cl.
CPC . *C01B 31/10* (2013.01); *A62D 9/00* (2013.01); *B01J 20/20* (2013.01); *B01J 20/28019* (2013.01); *C01B 31/081* (2013.01); *A62D 2101/02* (2013.01)
USPC .......................... 502/436; 502/418

(58) Field of Classification Search
USPC ................................ 502/418, 436
See application file for complete search history.

(56) References Cited

U.S. PATENT DOCUMENTS

| 4,683,030 A * | 7/1987 | Weber et al. ...................... 201/6 |
| 4,883,030 A * | 11/1989 | Tanahashi et al. .......... 123/193.3 |
| 5,977,016 A | 11/1999 | Von Blucher et al. |
| 6,184,177 B1 | 2/2001 | Von Blucher et al. |
| 6,300,276 B1 | 10/2001 | De Ruiter et al. |
| 6,376,404 B1 * | 4/2002 | Giebelhausen et al. ......... 502/10 |
| 7,288,504 B2 * | 10/2007 | Von Blucher et al. ......... 502/432 |
| 7,662,747 B2 * | 2/2010 | De Ruiter ....................... 502/418 |

FOREIGN PATENT DOCUMENTS

| DE | 27022 | 11/1964 |
| DE | 3304349 | 8/1984 |
| DE | 3813563 | 11/1989 |
| DE | 4304026 | 9/1993 |
| DE | 4328219 | 2/1995 |
| DE | 19600237 | 7/1996 |
| DE | 19625069 | 1/1998 |
| DE | 19860661 | 7/2000 |
| EP | 0 326 271 | 8/1989 |
| EP | 0814056 | 12/1997 |
| GB | 2 265 143 A | 9/1993 |
| GB | 2 280 898 A | 2/1995 |
| JP | 92816/90 | 4/1990 |
| WO | WO 96/21616 | 7/1996 |
| WO | WO 98/07655 | 2/1998 |
| WO | WO 99/28234 | 6/1999 |
| WO | WO 01/02295 | 1/2001 |

OTHER PUBLICATIONS

Database WPI, Section Ch, Week 199510, Derwent, Publications, Ltd., London, GB; AN 1995-074005 XP002178951 & SU 1 836 A (Strelko V V), Aug. 23, 1993 abstract.
Database CA 'Online!—Chemical Abstact Service, Columbus, Ohio, US: Okido, Sadao et al.: "Carbonization of Synthetic Resin" retrieved from STN Database accession No. 107:239318 CA XP002178950 abstract & JP 62 197308 A (Japan Organo Co., Ltd., Japan; Kuraray Chemical Co., Ltd.) Sep. 1, 1987.

* cited by examiner

*Primary Examiner* — Stuart Hendrickson
(74) *Attorney, Agent, or Firm* — Cozen O'Connor

(57) ABSTRACT

Disclosure is made of a specific process for producing activated carbon in spherical form, starting with organic polymer spherules based on styrene and divinylbenzene, wherein said polymer spherules contain chemical groups leading to the formation of free radicals and thus to cross-linkages by their thermal decomposition, in particular sulfonic acid groups. Furthermore, various application purposes for the thus-produced activated carbon spherules are named.

20 Claims, No Drawings

PROCESS FOR PRODUCING SPHERICAL ACTIVATED CARBON

CROSS-REFERENCE TO RELATED APPLICATIONS

This is a continuation of application Ser. No. 10/240,340, filed Oct. 1, 2002 now U.S. Pat. No. 7,288,504 which is a National Phase Application of PCT/EP01/04615 filed Apr. 24, 2001, which claims priority of corresponding applications having been filed in Germany on Apr. 28, 2000, No. 100 20 921.1; Germanyon Aug. 18, 2000, No. 100 40 485.5; Germany on Dec. 22, 2000, No. 100 65 936.5; Germany on Feb. 24, 2001, No. 101 09 158.3.

BACKGROUND OF THE INVENTION

Field of the Invention

The present invention relates to a process for producing activated carbon, particularly in spherical form ("carbon spherules"), as well as activated carbon products produced in this way and their use for various applications, in particular for filters or protective materials, such as protective suits.

Due to its rather unspecific adsorptive properties, activated carbon is the most widely used adsorbent. Legal regulations as well as an increased sense of responsibility for the environment has led to an increasing demand for activated carbon.

Activated carbon in general is obtained by smoldering (carbonization, pyrolysis) and subsequent activation of carbonaceous compounds, wherein those compounds are preferred which lead to economically reasonable yields, because the losses in weight, caused by the separation of volatiles in the carbonization step and by burning off in the activation step, are considerable. For further details on activated carbon production, reference can be made, e.g., to H. v. Kienle and E. Bäder, "Aktivkohle und ihre industrielle Anwendung" (Activated Carbon and the Industrial Use thereof), published by Enke Verlag, Stuttgart, 1980.

However, also the nature of the produced activated carbon—microporous or macroporous, solid or brittle—depends on the starting material. Common starting materials are coconut shells, chips of wood, turf, pit coal, pitches, as well as special plastics, which, inter alia, play a certain role in the production of activated carbon fabrics.

Activated carbon is used in various forms: pulverized coal, splint coal, granular coal, molded coal (cylinders of activated coal) and, since the end of the 70's, also spherical activated carbon ("carbon spherules"). Spherical activated carbon, being distinct from other forms of activated carbon, such as pulverized coal, splint coal, granular coal and the like, has a number of advantages, making it valuable—or even indispensable—for certain applications: it is flowable, enormously resistant to abrasion (dust-free), and very hard. Because of the high prices, however, the use thereof is essentially restricted to protective suits and high-quality filters for pollutants in air streams.

Carbon spherules, due to their specific form, as well as due to their extremely high resistance to abrasion, for example, in particular areas of application, such as surface filters for protective suits against chemical poisons and filters for low pollutant concentrations in large quantities of air, are in high demand. Thus, when loading reticulated, macroporous polyurethane foams with activated carbon according to DE 38 13 563 A1, only a readily flowable coal can be employed if also the internal layers of the foam material are to be optimally coated. In the production of protective suits against chemical poisons in accordance with DE 33 04 349 C3, for example, also only highly abrasion-resistant coal may be employed, and solely carbon spherules fulfill that requirement.

Today, carbon spherules are, for the most part, still produced in multi-stage and very sophisticated processes. The best-known process is the production of spherules from coal-tar pitch and suitable asphaltic residues from petroleum chemistry, which—in order to become unmeltable—are oxidized, carbonized and activated. For example, carbon spherules can also be produced in a multistage process, starting from bitumen. These multi-stage processes are very expensive and the correspondingly high price of these carbon spherules precludes their use for many applications in which carbon spherules should actually be preferred due to their properties.

Consequently, attempts were made to produce high-grade carbon spherules in a different way.

From the state of the art it is known to produce spherical carbon by carbonization and subsequent activation of fresh or spent ion-exchangers containing sulfonic acid groups, or by carbonization of ion-exchange precursors in the presence of sulphuric acid and subsequent activation wherein sulfonic acid groups or sulphuric acid have the function of a crosslinker, the yields—regardless whether starting from finished cation exchangers or unsulfonated ion-exchange precursors—being approx. 30 to 50%, based on organic or polymeric starting material. For example, such processes are disclosed in DE 43 28 219 A1 and DE 43 04 026 A1, as well as DE 196 00 237 A1, including the German supplementary application DE 196 25 069. However, these methods are unfavorable and problematic, particularly because large amounts of sulfur dioxide are released—approx. 1 kg of $SO_2$ per 1 kg final product—and because of, inter alia, the associated corrosion problems with the production equipment. When using spent ion-exchange resins, in particular spent cation-exchange resins, as starting materials, an additional problem arises in that the same—in spite of being washed with acid—are contaminated with cations, which then accumulate in the final product such that the production of larger quantities of carbon spherules having identical quality is consequently very difficult. When using ion-exchange precursors, i.e. polymer spherules without exchanger groups (sulfonic acid groups), in addition large amounts of sulphuric acid and/or oleum for cross-linking during carbonization are required.

WO 98/07655 discloses a process for producing activated carbon spherules, wherein firstly a mixture comprising a distillation residue stemming from diisocyanate production, a carbonaceous processing aid, and, optionally, one or several additional additives is processed into flowable spherules and then the thus-obtained spherules are subjected to carbonization and a subsequent activation step. In this process, too, large amounts of decomposition products are released discontinuously, which is associated with the above-mentioned problems.

Therefore, it is an object of the present invention to provide a novel process for producing activated carbon, particularly in the form of spherules, which is expected to avoid—at least in part—the disadvantages described above and which are related to the processes of the prior art. At the same time, such a process should enable a less sophisticated, possibly less cost-intensive production of activated carbon. In particular, in the case that the starting materials containing sulfonic acid group are used, the process should facilitate the disposal of the $SO_2$ that is generated.

It is a further object of the present invention to provide a process for producing activated carbon, particularly in spherulous form, which allows for the possibility of also employing—in addition to already-known starting materials for activated carbon production—new starting materials which have heretofore not yet been used for the production of activated carbon.

Applicants have now surprisingly discovered that the problem dealt with by the present invention may be solved by separating from each other the procedural steps required in the production of activated carbon—namely carbonization on the one hand and activation on the other hand—and by carrying out carbonization in a continuous manner while carrying out re-carbonization and activation in a discontinuous manner. In particular, the present invention is based on the separation of the corrosive phase (precarbonization step, in connection with $SO_2$ output) from the high-temperature phase (activation). Applicants have surprisingly discovered that the pre-carbonized starting material is no longer corrosive, i.e. by further increasing the temperature, corrosive agents are no longer generated.

THE INVENTION

Thus, a subject-matter of the present invention is a process for producing spherical activated carbon by carbonization and activation of polymer spherules based on styrene and divinylbenzene, wherein said spherules contain functional chemical groups, especially sulfonic acid groups, said chemical groups leading to the formation of free radicals and thus to cross-linkages by their thermal decomposition, wherein said polymer spherules are first subjected to a continuous pre-carbonization step and then are discontinuously treated in a re-carbonization and activation step.

In the smoldering step—synonymously also referred to as "carbonization" or "pyrolysis" and with reference to the present invention consisting of pre-carbonization and recarbonization—the carbonaceous starting material is converted into carbon, or in other words, the starting material is carbonized. During smoldering of the above-mentioned, in particular porous and/or gel-like organic polymer spherules based on styrene and divinylbenzene and containing functional chemical groups (particularly sulfonic acid groups), said functional chemical groups which lead to the formation of free radicals and thus to cross-linkages by their thermal decomposition, are destroyed—while separating volatiles, such as especially $SO_2$; thus, free radicals are formed that cause strong cross-linkages—in the absence of which there would not exist a pyrolysis residue (i.e. carbon) after all. In general, pyrolysis is conducted in an inert atmosphere (e.g. nitrogen), or—at most—under slightly oxidizing atmosphere. Similarly, it may be advantageous during smoldering, in particular at higher temperatures (e.g. ranging from approx. 500° C. to 650° C.) to add a minor amount of oxygen, especially in the form of air (e.g. 1 to 5%) to the inert atmosphere to cause oxidation of the carbonized polymer backbone and to thus facilitate the activation.

According to the present invention, continuous pre-carbonization may be carried out, for example, in a rotary tube, working continuously and having a temperature gradient of from 100° C. to 850° C., preferably from 100° C. to 650° C. Total duration should be approx. 1 hour to approx. 4 hours, preferably approx. 2 hours to approx. 3 hours. In so doing, particularly, the carbonized material should reach a temperature of from 400° C. to 800° C., preferably 550° C. to 600° C. As mentioned above, preferably inert conditions (e.g. nitrogen), or at best slightly oxidizing conditions should be applied. Subsequently, the continuously carbonized material may be collected in a preferably heat-insulated vessel and, when the filling capacity of said heat-insulated vessel is reached, may then be introduced into a rotary tube, working discontinuously for further pyrolysis (re-carbonization) and subsequent activation.

During carbonization, particularly re-carbonization, a small amount of oxygen or air, respectively, (e.g. approx. 1 to 5%) may be added to the inert gas (e.g. nitrogen), especially in the range of higher temperatures (e.g. in the range from approx. 500° C. to approx. 650° C.). This may facilitate activation, as it is discussed in further detail in the following.

Carbonization, according to the invention, comprising pre-carbonization and re-carbonization, is followed by activation. The latter is performed under conditions known per se. The basic principle of activation is to decompose a portion of the carbon generated in the carbonization step in a selective and targeted manner under appropriate conditions. In so doing, numerous pores, fissures and cracks are generated and the surface area, in respect to the unit of mass, increasey considerably. Thus, in the activation step, coal is burned off in a selective manner. Because carbon is decomposed during activation, in part a considerable loss in substance occurs in this process, which, under optimal circumstances, is tantamount to an increase in porosity and an increase of the internal surface (pore volume). Activation, therefore, takes place under selective or controlled oxidizing conditions, respectively. Usual activation gases generally include oxygen, in particular in the form of air, water vapor and/or carbon dioxide, as well as mixtures of these activation gases. As oxygen poses the risk that the impact is not only selective, but occurs on the total surface—thus burning off the carbon to a higher or lesser degree—water vapor and carbon dioxide are given preference. Water vapor is particularly preferable, optionally in admixture with an inert gas (e.g. nitrogen). To obtain a technically sufficient high reaction rate, activation is performed in general at temperatures ranging from approx. 800° C. to approx. 1000° C.

According to the present invention, activation may especially be carried out with a mixture of water vapor and nitrogen, in particular at temperatures of from approx. 850° C. to approx. 960° C., preferably from approx. 910° C. to approx. 930° C. The durations may range from approx. 2 hours to approx. 5 hours, preferably approx. 2 hours to approx. 3 hours.

The process of the present invention, for example, may be performed in such a manner that at first the continuous pre-carbonization is carried out within the first 80 minutes to 120 minutes at temperatures of up to approx. 650° C., preferably at approx. 500° C., in which step the largest part of the $SO_2$ is expelled and then, after completing re-carbonization, activation at approx. 850° C. to approx. 950° C., in particular at approx. 910° C. to approx. 930° C. is effected, wherein the activation takes—depending on the desired inner surface of the activated carbon spherules and the volume or filling level of the rotary tube—approx. 2 hours to approx. 5 hours and, as an activation gas, preferably water vapor in nitrogen, especially preferable approx. 25% water vapor in nitrogen, is employed.

According to the present invention, as a starting material for the inventive production of spherical activated carbon, polymer organic spherules based on styrene and divinylbenzene are employed, containing functional chemical groups, said chemical groups leading to the formation of free radicals and thus to cross-linkages as a result of their thermal decomposition, in particular acidic groups, such as sulfonic acid groups. As starting materials, for example, organic polymer spherules can be used, having a polymer backbone substantially consisting of polystyrene, wherein the polystyrene chains may be, at some spots, connected or cross-linked, respectively, through a component having at least two vinyl groups per molecule, in particular divinylbenzene, and the polymer skeleton may contain functional chemical groups, particularly sulfonic acid groups, said chemical groups leading to the formation of free radicals and thus to cross-linkages as a result of their thermal decomposition. In particular, the starting material used, according to the present invention, for the production of spherical activated carbon is organic polymer spherules based on polystyrene and having divinylbenzene cross-linkages wherein said polymer spherules comprise functional chemical groups, particularly acidic groups, like sulfonic acid groups, said chemical groups leading to the formation of free radicals and thus to cross-linkages by their thermal decomposition; therein, the divinylbenzene content, based on polymer spherules, may be up to approx. 20%, particularly up to approx. 15%, preferably up to approx. 10% by weight. Instead of divinylbenzene, for the cross-linking of polystyrene, however, a comparable organic, in particular aromatic organic compound suitable for the cross-linking of polystyrene and having at least two cross-linking groups per molecule (in particular vinyl groups) may also be employed.

The polymeric starting material, for example, may be present in a porous, particularly macroporous, and/or gel-like form. In case of gel-like starting materials, microporous polymer particles are preferably used. Macroporous or microporous, gel-like starting materials are preferably used.

Since the form or shape of the polymeric starting material is substantially maintained in the carbonization and pyrolysis steps—the carbonization and activation however leading to a reduction in particle size or particle diameter—the production of activated carbon in spherical form also has to start with polymer spherules, i.e. polymers in spherical form or approximately spherical form. In general, polymer spherules used in accordance with the present invention have diameters of up to approx. 2 mm, in particular of up to approx. 1.5 mm or less.

According to the first embodiment of the present invention, the chemical functional groups, leading to cross-linkages upon carbonization or pyrolysis, particularly sulfonic acid groups, are already present in the starting material. It is preferable in this embodiment that the weight ratio of polymer/functional groups or polymer/sulfonic acid groups, respectively, is approx. 2:1 to approx. 1:1.

Examples of polymeric starting materials, in which the functional chemical groups leading to cross-linkages during the carbonization or pyrolysis steps, particularly sulfonic acid groups, are already present in the actual starting material, are ion-exchange resins, in particular strongly acidic cation-exchange resins, i.e. cation exchange resins having sulfonic acid groups. These can either be unspent or also spent ion-exchange resins. In the case of spent cation exchangers, they can be contaminated with metal ions, which are then present in the final product as a catalytic metal impregnation.

In the case that it is started with spent or unspent ion-exchangers, the present invention relates also to a process for disposing spent or unspent ion-exchangers. Hence, the process of the present invention is capable of converting spent ion-exchangers, to be disposed of, into a useful product—i.e. activated carbon—which, due to its property to adsorb environmental poisons, contributes to the protection of the environment.

Further examples of polymeric starting materials, in which the functional chemical groups, leading to cross-linkages during the carbonization or pyrolysis steps, particularly sulfonic acid groups, are already present in the actual starting material, are acidic organic catalysts, for example catalysts for the synthesis of bisphenols or the synthesis of MTBE (MTBE=methyl-tert. butyl ether), preferably sulfonic acid group containing organic catalysts. Particularly preferred are acidic organic catalysts of the type as described above, which are porous and/or gel-like.

For, applicant has surprisingly discovered that, for example, acidic organic catalysts accumulating in the synthesis of MTBE or bisphenols and which have become inactive, are a good starting material for the production of carbon spherules. The spherical catalyst material originating from the reactor for the synthesis of bisphenol or MTBE may then, optionally after a washing and drying step, be carbonized and activated in a manner in accordance with the present invention. Phenol, which still adheres in the case of catalysts, resulting from the synthesis of bisphenol, is destroyed in the carbonization or pyrolysis step and/or burnt off in the post-combustion step. The yields of activated carbon spherules in the case of organic catalysts are similar to those of cation exchangers. Contrary to spent ion-exchangers, however, with spent organic catalysts no accumulation of cations in the carbon is to be expected. According to the present invention, as the starting materials, spent or exhausted acidic organic catalysts resulting from the synthesis of MTBE or from the synthesis of bisphenols from phenol and acetone, which accrue as a waste material, are readily employable and thus can be conveniently disposed of.

In the case of starting from acidic organic polymeric catalysts based on styrene and divinylbenzene, which are spent or have become inactive, in particular from the synthesis of MTBE or bisphenols, the present invention also relates to a process for the disposal of catalysts which are spent or have become inert. The inventive process is able to convert waste, to be disposed of, into a useful product—i.e. activated carbon—which, by virtue of its property to adsorb environmental poisons, contributes to the protection of the environment.

Also in this first embodiment of the present invention, according to which the functional chemical groups leading to cross-linkages during the carbonization or pyrolysis steps, particularly sulfonic acid groups, are already present in the original starting material, an amount of from 5 to 25% $SO_3$ in the form of sulphuric acid and/or oleum may be added before and/or during the carbonization step, especially to increase the yield of carbon spherules. Thereby, the periods of pre-carbonization may be shortened, for example to approx. 30 to approx. 120 minutes, in particular approx. 30 to approx. 90 minutes or less.

It was found that the yields of carbon spherules are improved, as the acid content of the starting material, in particular ion-exchangers or catalysts, increases. Thus, as mentioned above, particularly in the case of ion-exchangers or catalysts having a low acid content, some oleum and/or sulphuric acid may be added in order to improve the yield. Normally, for example, approx. 5 to approx. 25% of bound or free $SO_3$, based on the polymer portion in the starting material, are sufficient.

According to a second embodiment of the present invention, the functional chemical groups, leading to cross-linkages during the carbonization or pyrolysis steps, particularly sulfonic acid groups, are not yet present in the original starting material but still have to be generated in situ. Preferably, this is done by introducing said chemical functional groups leading to cross-linkages, in particular sulfonic acid groups, only with the beginning, i.e. before and/or during said pre-carbonization step. This may, for example, be accomplished by the addition of $SO_3$, in particular in the form of oleum, optionally in admixture with sulphuric acid, before and/or during pre-carbonization to said polymeric organic starting material in spherical form. Here, the weight ratio polymer/oleum 20% may be particularly approx. 1:1 or the weight ratio polymer/oleum 20%/sulphuric acid may be in particular approx. 1:1:0.5, respectively.

Examples of such starting materials, according to this second embodiment, in which the functional chemical groups leading to cross-linkages, particularly sulfonic acid groups, are not yet present in the actual starting material, but have to be generated in situ before and/or during pre-carbonization, are precursors of ion-exchangers, i.e. organic polymer spherules without functional groups which must be sulfonated before and/or during carbonization, for example by addition of $SO_3$ in the form of oleum or sulphuric acid.

The precursors of ion-exchangers may basically be gel-like or macroporous. The latter are much more expensive, primarily because of their considerably higher divinylbenzene content. The numerous mesopores thereof remain completely intact during the conversion to activated carbon, which is useful for some applications. The gel-types, however, lead to markedly microporous coals: the pore volume can be present up to 90 to 95% as micropores. The gel types often contain approx. 2 to approx. 8% divinylbenzene. However, also types with only weak cross-linkages, having lower contents of divinylbenzene (approx. 2 to 4% divinylbenzene) survive the heavy swelling in the acid, i.e. they do not burst or break up into hemispheres. It has become evident that also types with a very low divinylbenzene content are well suited according to the present invention. Sulfonation, which has to be as complete as possible, is much more important because in the decomposition of sulfonic acid groups, those free radicals are produced that lead to the cross-linking being responsible for the yield.

When employing precursors of ion-exchangers (i.e. pure polymers), gel types are preferred, whereas when starting from cation exchangers, both macroporous and gel types can be employed, the selection being rather based on economic considerations. The reason is that macroporous precursors absorb very large amounts of acid or oleum into their large pores—similar to a blotter—such that the mixture of polymer and acid is dry or sandy, and the uniform distribution of acid can hardly be achieved. Apart from that, however, carbonization and activation of cation exchangers lead to comparable products, as if starting from precursors plus acid.

The particle size of the obtained carbon spherules depends on the size of the spheres in the starting material. Commercial base products in general lead to activated carbon spherules with a diameter of from approx. 0.2 mm to approx. 1.0 mm, in particular approx. 0.3 to approx. 0.8 mm.

For example, the process according to the invention can be typically carried out as follows:

Suitable polymeric, spherical starting material, containing sulfonic acid groups, based upon styrene and divinylbenzene, e.g. cation exchangers or organic acidic catalysts, are introduced into a rotary tube, working continuously and having a temperature gradient of from approx. 100° C. to approx. 850° C., and preferably approx. 100° C. to approx. 650° C., and are pre-carbonized. The duration may then be from approx. 1 to 2 hours, for example. A final temperature of at least approx. 550° C. should be reached.

When working, for example, with precursors of ion-exchangers, i.e. polymer spherules based on styrene and divinylbenzene, having no functional groups, e.g. sulphuric acid and/or oleum may be blown in at the front end of the rotary tube, e.g. at approx. 100° C., the rotary movement ensures thorough mixing, which should preferably be finished before temperatures of approx. 200° C. are reached, which is not a problem with the appropriate internal fittings. For example, 1 part polymer spherules (ion-exchange precursors) plus 1 part oleum 20% plus ½ part sulphuric acid 98% produced very good results, whereby the excess in liquid phase herein provides particularly good mixing.

The hot, pre-carbonized material can then be collected in a vessel, which preferably should be heat-insulated until a charge for the discontinuously working rotary tube is collected.

Subsequently, the preferably still hot, pre-carbonized, flowable material may be subjected to final pyrolysis (re-carbonization) in a discontinuously working rotary tube, and be activated in a manner that is well known to those skilled in the art. Since the activation takes a comparatively long time, a continuously working rotary tube for this processing step is not viable because it would have to be extremely long. Depending on the degree of activation, yields of carbon spherules of from 50 to 75%, with respect to polymeric starting material, were achieved.

As mentioned above, activation may be facilitated by adding, during re-carbonization, particularly in a range from approx. 500° C. to approx. 650° C., a small amount of oxygen, particularly in the form of air (e.g. approx. 1 to 5%) to the inert gas. This leads to the oxidation of the carbonized polymer skeleton, which, by splitting off oxygen as CO at from approx. 700° C. to approx. 750° C., leads to an initial porosity, which promotes activation in the interior of the bulk. The activation may be performed, for example, with air, $CO_2$ and/or $H_2O$ (water vapor), preferably with water vapor, optionally in mixture or dilution with an inert gas (e.g. nitrogen). Good results, for example, were obtained with a ratio water vapor/inert gas of approx. 1:3.

Thus, as an example, the process of the present invention can be carried out such that the starting material is continuously pre-carbonized at temperatures of up to a maximum of approx. 850° C., preferably of up to a maximum of approx. 650° C., then, optionally, the pre-carbonized material is collected in a vessel, and finally it is discontinuously recarbonized and activated at temperatures from approx. 850° C. to approx. 950° C., in particular approx. 910° C. to approx. 930° C., under per se known conditions, preferably with water vapor (optionally in mixture or dilution with an inert gas, such as nitrogen), wherein in the pre- and/or re-carbonization steps, optionally, a small amount of oxygen, especially in the form of air (e.g. approx. 1 to 5%) can be added to the inert gas, particularly at temperatures from approx. 500° C.

While in processes known from the state of the art, wherein both carbonization and activation steps are performed batchwise or discontinuously, very large amounts of corrosive $SO_2$ accrue in batches, causing problems with disposal or handling, in the process according to the present invention, however, $SO_2$ is released in a continuous manner during the continuous pre-carbonization step, which enormously facilitates the disposal or handling thereof. In fact, except in the process starting from pit coal-tar pitch, processes known in the prior art have the common feature that, per kg of final product, very large amounts of $SO_2$, namely approx. 1 kg, are released, the release of $SO_2$ primarily taking place between approx. 300° C. and approx. 450° C., that is, at $SO_2$ peaks, thus making disposal enormously difficult. $SO_2$-washers, in the state-of-the-art processes, have to be adapted to the $SO_2$ peaks such that they are completely over-dimensioned for the rest of the time of the process, and the recovery of $SO_2$ is very difficult.

Therefore, there was an urgent need to substantially facilitate the disposal of $SO_2$ occurring in the activated carbon production, in particular during pyrolysis or carbonization. The solution according to the present invention is to carry out pre-carbonization, which is substantially completed at approx. 600° C., on a continuous basis such that a uniform output of $SO_2$ (and of some volatile hydrocarbons) takes place while the activation is performed in a discontinuous manner.

The advantages of separating the acidic phase (pre-carbonization) from the high-temperature phase (activation) are numerous:

1. The continuously working rotary tube for pre-carbonization can be made of particularly acid-proof types of steel, which are less suitable for high temperatures, whereas the discontinuously working rotary tube (re-carbonization and activation) can be made of steel that is especially suitable for high temperatures. In other words, separation of the comparatively fast, corrosive stage, under the release of a great amount of $SO_2$ (pre-carbonization), from the comparatively slow activation enables an optimal adaptation of the equipment being used. Since, for example, pre-carbonization in the presence of acid may only require approx. 60 to approx. 120 minutes, whereas the activation, however, takes several hours, the rotary tube for pre-carbonization may have smaller dimensions than the rotary tube for re-carbonization/activation (The long duration in the large rotary tube for the activation is also the reason why it is not operated on a continuously working basis because the required length thereof would be enormous.).
2. Washers (washing devices) for $SO_2$ may have much smaller dimensions than those of state of the art processes because no $SO_2$ peaks have to be handled anymore, but $SO_2$ output is continuous and uniform.
3. Regular, continuous output of $SO_2$ in the process of the present invention allows its recovery, in particular in connection with a catalytic oxidation to $SO_3$, and, optionally, further conversion into sulphuric acid or oleum, respectively, which can be much more favorably disposed of than sulfite liquor, or may even be re-employed or re-circulated in the process according to the present invention, for example especially when employing precursors of ion-exchangers as starting material.
4. The process of the invention provides the opportunity to dispose of waste products, as it is the case for spent ion-exchangers and spent catalysts, and to convert them into useful products, i.e. activated carbon spherules. According to the process of the present invention, highly useful, high-quality, abrasion-resistant activated carbon spherules, are obtained at good yields also from waste materials to be disposed of, which otherwise would have to be disposed of in another way—in particular they would have to be burnt off or stored. Therein lies another advantage of the present invention, especially in times of increasing environmental awareness. Thus, another subject-matter of the present invention is equally a process for disposing of as well as regenerating waste materials.

In addition, another subject-matter of the present invention is products obtained or obtainable according to the process of the present invention, i.e. activated carbon in spherical form.

As mentioned before, the particle size of carbon spherules obtained depends on the starting material. Commercial starting products lead, in general, to activated carbon spherules with diameters of from approx. 0.2 mm to approx. 1.0 mm, in particular diameters from approx. 0.3 mm to approx. 0.8 mm, with average diameters from approx. 0.4 mm to approx. 0.5 mm. During carbonization and activation, the spherical form of the starting materials is preserved, i.e., through the form of the starting materials, the particle size of the final product may be selectively controlled and determined, representing another advantage of the process according to the present invention.

The diameter of the thus produced activated carbon spherules is approx. 0.1 mm smaller than that of the starting polymer spherules such that, through appropriate selection of the starting material, the diameter of carbon spherules may be controlled. For most applications, spherule diameters of from approx. 0.2 mm to approx. 1.0 mm, in particular approx. 0.3 mm to approx. 0.8 mm, with average diameters of approx. 0.4 mm to approx. 0.6 mm, are particularly suitable.

By activation, internal surfaces of from approx. 800 $m^2$/g to approx. 1500 $m^2$/g are obtainable, preferably being approx. 900 $m^2$/g to approx. 1200 $m^2$/g. Bursting pressure for an individual activated carbon spherule in general is approx. 5 Newton to approx. 20 Newton. Apparent density is approx. 400 g/l to approx. 800 g/l, preferably approx. 500 g/l to approx. 750 g/l.

Carbon spherules obtained in accordance with the invention, are highly abrasion-resistant—abrasion is up to 100 times less than that of good grain carbon—flowable, dust-free, and highly pressure-resistant. Thus, another subject-matter of the present invention is activated carbon spherules having a high strength, in particular abrasion-resistance, which can be produced in accordance with the process of the present invention.

Of major importance to the activity of carbon spherules are the pores of activated carbon, in particular the micropores having a diameter of up to approx. 20 Å, since these lie within the order of magnitude of most molecules to be adsorbed. In general, the major portion of the inner surface of activated carbon is owed to micropores as well. In addition, the so-called mesopores—sometimes referred to as transitional pores or supply pores—with diameters of from approx. 20 to approx. 500 Å are also of importance. Furthermore, a portion of even bigger macropores exists. By selection of raw materials and procedural steps during the activation, the properties of the final products can be selectively controlled. A higher proportion of micropores is desirable.

To those skilled in the art, it is known that pore volume, pore diameter, and pore distribution vary depending on the degree of activation, and the pore system and pore structure, in particular the pore diameter, as well as the surface structure of the final product may be influenced selectively by the temperature and activation, such that in this regard, reference can be made to the pertinent technical literature.

Activated carbon spherules produced through the process according to the invention, exhibit from good to excellent adsorption properties.

Moreover, there is a possibility to influence or modify the adsorption properties of activated carbon spherules produced according to the invention by impregnation with catalysts (enzymes, metals, such as e.g. copper, silver, platinum, chromium, zinc, mercury, palladium, cadmium, iron, etc., as well as compounds of these metals). Thus, the activated carbon product obtained according to production process of the invention may also comprise a catalytically effective component, preferably a compound of a catalytically active metal. Impregnation of activated carbon with catalysts is per se well known to those skilled in the art, so that reference can be made in this regard to pertinent technical literature.

Activated carbon spherules produced according to the process of the present invention, can be used in any number of different applications. Activated carbon spherules produced according to the process of the present invention, for example, can be used in the production of adsorbent materials such as adsorption (surface) filters, filter mats, odor filters, surface filters for protective suits, particularly for civil and/or military purpose, ambient air purifying filters, gas mask filters, and adsorbing substrate structures, or, for protective materials, in particular protective suits against chemical poisons such as warfare agents, or else for filters, particularly filters for removing of pollutants, toxic agents and/or odorous agents (odorants) originating from air or gas streams.

Another subject-matter of the present invention, therefore, is also the adsorption materials containing activated carbon spherules which are produced in accordance with the present invention, particularly filters of any kind such as adsorbent (surface) filters, filter mats, odor filters, surface filters for protective suits, particularly for civil and/or military purpose, such as protective suits against chemical poisons such as warfare agents, ambient air-purifying filters as well as protective suits produced therefrom, gas-mask filters, filters for removing of pollutants, toxic agents and/or odorous agents (odorants) originating from air or gas streams and adsorbing substrate structures.

The present invention is now illustrated by way of working examples, which shall in no way be restrictive toward the present invention.

In reading the description and examples, one skilled in the art will be able to conceive numerous other designs, variations, or modifications of the present invention, without deviating from the scope of the present invention.

WORKING EXAMPLES

Example 1

1000 g of gel-like, spherical, porous polymer, said polymer being based on styrene and 4% divinylbenzene, was wetted with 750 g of oleum 20%. The acid was absorbed within a few minutes, resulting in a still somewhat flowable product. The latter was then fed into a rotary tube, working continuously and having a temperature gradient, and pre-carbonized during 30 minutes (total duration). After the acid had been eliminated substantially in form of $SO_2$ and $H_2O$, a total of 940 g of brilliant, black spherules was obtained. After being kept in a heat-insulated vessel for a short period of time they were then fed into a discontinuously working rotary tube in one charge, while still hot, and re-carbonized therein and activated at 925° C. with water vapor/nitrogen in a ratio of 1:3 over a period of three hours.

As a result, 645 g of carbon spherules (iodine number: 950) were obtained with an average diameter of 0.45 mm, a bursting pressure per spherule of ≥1000 g, an apparent density of 660 g/l, and an ash content of ≤0.1%. The carbon spherules had a pore volume of approx. 0.5 ml/g, consisting of at least 90% micropores.

Example 2

In a beaker, 1000 g of precursor from DOWEX HCR-S, a precursor for a cation-exchange resin, were mixed with 750 g of sulphuric acid and 250 g of oleum with 20% $SO_3$. Within a few minutes, sulphuric acid was completely absorbed while the polymer spherules were swelling.

This material was pre-carbonized in a rotary tube, working continuously and exhibiting a temperature gradient. The rotary tube consisted of a quartz (silica) tube (Ø 40 mm, length 800 mm), which was heated up to 650° C. and purged with some nitrogen. Steel wire wound into spiral form in the interior of the tube, provided for the transport of the contents. The rotary tube was continuously filled with a mixture of precursors and sulphuric acid at the non-heated end thereof and the rotational speed was regulated to 50 such that, in the hot zone, a duration of 20 minutes was achieved. The other end of the tube was loosely sealed with a tin container having a circular aperture, in which pre-carbonized material was collected. As a result, a total of 820 g of black, dry, and flowable spherules were obtained. Thereby, a total of approx. 500 g of $SO_2$ and some carbonaceous, non-identifiable products had been split. A tarry condensate was not observed.

The pre-carbonized material was then subjected to further processing in a discontinuously working rotary tube, supplied by PLEQ Co., i.e. subjected to re-carbonization and activation. Within 45 minutes, 500° C. had been reached. At this temperature, 5% of air were added to the purge gas (nitrogen) and heated up to 650° C. in the following 45 minutes. Then, 25% of water vapor was added to the purge gas, and the temperature was brought to 900° C. within 30 minutes. The final temperature was maintained for 90 minutes. After cooling down under nitrogen to 400° C., the rotary tube was emptied. As a result, 490 g of excellent carbon spherules with an interior surface (BET) of 1200 $m^2/g$ and an average diameter of 0.46 mm were obtained.

Example 3

Example 2 was repeated, except that to 1000 g of precursor material 1000 g of oleum 20% and 500 g of sulphuric acid were added. A highly flowable mixture was obtained. Duration in the continuously working rotary tube was increased to 90 minutes. 1090 g of black, dry, and flowable spherules were obtained, which were activated to a BET surface of 950 $m^2/g$. The yield was 790 g.

The various features of novelty which characterize the invention are pointed out with particularity in the claims annexed to and forming a part of this specification. For a better understanding of the invention, its operating advantages and specific objections obtained by its use, reference should be had to the accompanying drawings and descriptive matter in which there is illustrated and described a preferred embodiment of the invention.

The invention claimed is:

1. A process for producing an activated carbon spherule comprising:
    continuously pre-carbonizing a starting material which comprises a polymer spherule wherein said polymer spherule is based on styrene and divinylbenzene and comprises chemical groups which form free radicals and cross linkages by thermal decomposition, the continuous pre-carbonization being performed in a rotary apparatus working continuously at a temperature of from 100° C. to 850° C. to form a pre-carbonized polymer spherule; and subsequently
    discontinuously treating said pre-carbonized polymer spherule in a re-carbonization and activation step to produce the activated carbon spherule, the re-carbonization and activation being performed in a second rotary apparatus operating at a temperature of from 850° C. to 950° C.

2. The process of claim 1 wherein the first rotary apparatus is a first rotary tube and the second rotary apparatus is a second rotary tube.

3. The process of claim 2, wherein the chemical groups are sulfonic acid groups.

4. The process of claim 3 wherein the chemical groups are already present in the starting material.

5. The process of claim 2 wherein the starting material is selected from the group consisting of an ion-exchanger, an acid organic catalyst and mixtures thereof.

6. The process of claim 5 wherein the ion-exchanger is a strongly acid ion exchanger and the acid organic catalyst is a catalyst such as a catalyst for the synthesis of bisphenols or the synthesis of methyl tert.-butyl ether.

7. The process of claim 5 wherein an amount of about 5 to about 25% $SO_3$ is added to said ion-exchanger and/or to said acid organic catalyst before and/or during the carbonization step.

8. The process of claim 7 wherein said ion exchanger is a strongly acid ion-exchanger.

9. The process of claim 7 wherein said sulfonic acid groups are introduced before and/or during the pre-carbonization step.

10. The process of claim 9 wherein the sulfonic acid groups are introduced by addition of $SO_3$ in the form of oleum.

11. The process of claim 3 wherein the polymer spherule is porous or gel-like.

12. The process of claim 1 wherein the pre-carbonized material is continuously collected in a heat-insulated vessel and is then introduced into a reaction vessel working discontinuously for further re-carbonization and subsequent activation.

13. The process of claim 12 wherein the pre-carbonized material is collected in the heat insulated vessel until the vessel's capacity is reached and the reaction vessel is a rotary tube.

14. The process of claim 2 wherein said activation is conducted with a mixture of steam and nitrogen at a temperature of from about 850° C. to about 950° C. for a residence time of about 2 to about 5 hours.

15. The process of claim 1 wherein the weight ratio of polymer/sulfonic acid groups is about 2:1 to about 1:1.

16. The process of claim 5 wherein an amount of about 5 to about 25% $SO_3$ in the form of sulphuric acid and/or oleum is added to said ion-exchanger and/or to said acid organic catalyst before and/or during the carbonization step.

17. The process of claim 10 wherein the oleum is in a mixture with sulphuric acid.

18. The process of claim 11 wherein the polymer spherule is microporous.

19. The process of claim 14 wherein the temperature is from about 910° C. to about 930° C.

20. The process of claim 14 wherein the residence time is about 2 to about 3 hours.

* * * * *